Figure 1:
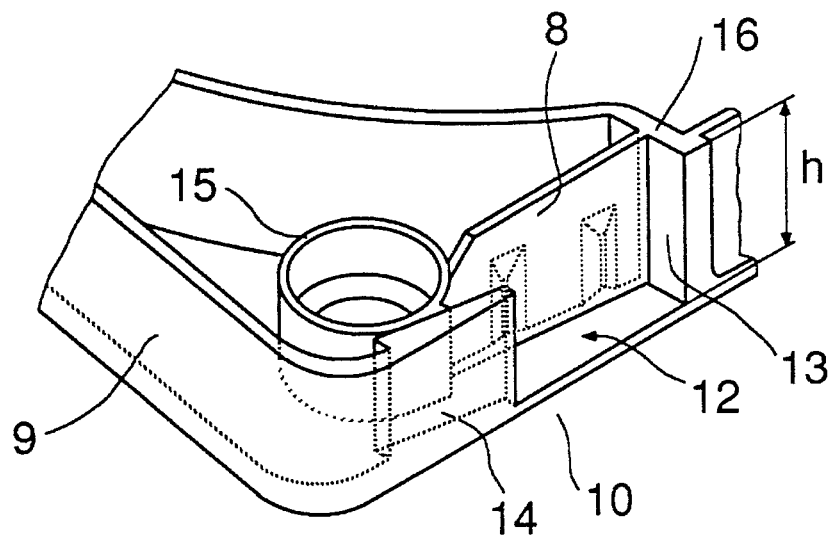

United States Patent [19]

Schoettle et al.

[11] Patent Number: 5,481,426
[45] Date of Patent: Jan. 2, 1996

[54] CASSETTE WITH RECORDING MEDIUM, IN PARTICULAR MAGNETIC TAPE CASSETTE

[75] Inventors: Klaus Schoettle, Heidelberg; Juergen Dreyer; Bozidar Pavelka, both of Willstaett; Kurt Schmidts, Schwanau, all of Germany

[73] Assignee: BASF Magnetics GmbH, Mannheim, Germany

[21] Appl. No.: 248,551

[22] Filed: May 24, 1994

Related U.S. Application Data

[62] Division of Ser. No. 928,606, Aug. 13, 1992, abandoned.

[30] Foreign Application Priority Data

Aug. 16, 1991 [DE] Germany .......................... 91 10 112 U

[51] Int. Cl.⁶ .................................................. G11B 23/02
[52] U.S. Cl. ........................................................ 360/132
[58] Field of Search ...................... 360/132, 60; 242/197, 242/198, 199

[56] References Cited

U.S. PATENT DOCUMENTS

| | | | |
|---|---|---|---|
| 4,044,386 | 8/1977 | Satou et al. | 360/132 |
| 4,053,935 | 10/1977 | Shiba | 360/60 |
| 4,460,930 | 7/1984 | Takahashi | 360/132 |
| 4,484,248 | 11/1984 | Ogiro et al. | 360/132 |
| 4,536,812 | 8/1985 | Oishi et al. | 360/133 |
| 4,769,731 | 9/1988 | Schoettle et al. | 360/132 |
| 4,908,725 | 3/1990 | Iwahashi | 360/132 |
| 5,087,998 | 2/1992 | Oishi | 360/132 |
| 5,124,397 | 6/1992 | Kanazawa et al. | 524/496 |
| 5,132,862 | 7/1992 | Haveron et al. | 360/132 |
| 5,189,582 | 2/1993 | Hanson et al. | 360/60 |

FOREIGN PATENT DOCUMENTS

| | | | |
|---|---|---|---|
| 274566 | 7/1988 | European Pat. Off. | |
| 2323611 | 12/1974 | Germany . | |
| 2604172 | 8/1977 | Germany . | |
| 62-214573 | 9/1987 | Japan | 360/60 |
| 63-153780 | 6/1988 | Japan | 360/60 |
| 4-186584 | 7/1992 | Japan | 360/60 |

*Primary Examiner*—John H. Wolff
*Assistant Examiner*—Allen Cao
*Attorney, Agent, or Firm*—Keil & Weinkauf

[57] ABSTRACT

A cassette with a recording medium, in particular a magnetic recording medium, is designed with a displaceable identification part which can be pushed into the cassette housing. For this purpose, a web is provided behind a cassette opening in a cassette wall, which web runs at an angle with respect to the cassette wall. It is also possible to provide a web which is approximately parallel to the cassette wall, and the identification part, designed as a slide, is provided with a front beveling, in the opening sliding direction, in order to push the slide partially past the edge of the cassette wall located in the opening direction. The cassette can be used for recording/reproducing signals of any type, and any functions of the associated cassette apparatus can be controlled indirectly by the positionally displaceable identification part.

17 Claims, 6 Drawing Sheets

CASSETTE WITH RECORDING MEDIUM, IN PARTICULAR MAGNETIC TAPE CASSETTE

This application is a division of application Ser. No. 07/928,606, filed on Aug. 13, 1992, now abandoned.

The present invention relates to a cassette with a recording medium, in particular a magnetic tape cassette, comprising a housing with top, bottom and front, rear and side walls, an opening being provided in at least one of the front, rear and side walls, with a displaceable identification part closing this opening at least partially, and at least one hook part of the identification part gripping around a wall of the housing.

Erase tabs which are located on the rear side of the housing and, while present, do not prevent erasure of the recorded information are known from commercially available audio and video cassettes. In order to protect recorded information from erasure, these erase tabs have to be broken out and the cavity produced sends the equipment the identification signal to inhibit the recording and erasing mechanism. To make such a cassette able to record again, it is necessary to tape over the cavity, which is unsatisfactory however since the detecting means of the equipment may be very sensitive and consequently the expected success of erasing and re-recording is not achieved.

German Laid-Open Application DOS 2,323,611 discloses identification parts for cassettes which are designed as a metal or plastic element with two tongues and are able to either cover or expose neighboring clearances by independent actuation of the tongues. The metal or plastic identification elements are displaceable in a groove on the outside of the cassette housing, and consequently their function may be impaired by the effect of particles or dirt.

U.S. Pat. No. 4,769,731 discloses a cover-symmetrical identification part which, when fitted, grips around at least one jacket wall and can be displaced between two positions, opening or closure, only in the plane of one jacket side, of for example a data diskette.

It is an object of the present invention to avoid the disadvantages of the known identification elements and to provide a cassette with a more expedient identification part.

We have found that, in the case of a cassette with a recording medium, in particular a magnetic tape cassette, comprising a housing with top, bottom and front, rear and side walls, an opening being provided in at least one of the front, rear and side walls, with a displaceable identification part closing this opening at least partially, at least one hook part of the identification part gripping around an inner wall of the housing, this object is achieved according to the invention by the identification part being displaceable by means of the hook part, guided on an inner wall of the housing, which inner wall is provided at an angle to the rear wall in the interior of the housing, so that the identification part can be displaced in the opening direction along an oblique path into the housing.

The object is likewise achieved in the case of a cassette defined above if the identification part is displaceable by means of the hook part, guided on an inner wall of the housing, which inner wall is provided essentially parallel to the rear wall in the interior of the housing and the identification part is provided in the opening direction with a beveling, for displacing into the housing along a displacement path substantially parallel to the rear wall of the housing.

Both versions of the cassette according to the invention solve the problem of displacing an identification part, which in the closed position is arranged over a housing opening, partially flush with the housing outer wall, in a guided manner into the interior of the cassette, so that the housing opening is exposed, and of allowing the displacing operation to then be reversed with the same precision until the closed position is reached. At the same time, mass production of the cassette is also achieved by a simple design of the identification part itself and few modifications to parts of commercially available cassettes.

In a practical embodiment, the wall may be a web on the bottom or top wall of the housing.

If such a web is not already provided and able to be used, it should be formed on the bottom wall or on the top wall, which is easily carried out by injection molding. The web on which the hook part can be displaced may be expediently arranged at an angle of at least about 5°, preferably of about 10° to about 20°, with respect to the longitudinal axis of the rear wall.

This makes it possible, even without special flattening of the identification part, to push the latter at least partially behind a part of the rear wall, that is to say in the longitudinal direction into the housing, so that a cavity for equipment sensing is exposed.

In a further embodiment, with displacement in the vertical direction, the web on which the hook part can be displaced may be arranged at an angle of at least about 5°, preferably of about 10° to about 20°, with respect to an axis of the rear wall arranged vertically to the longitudinal axis.

Consequently, displacement behind the upper part of the rear wall, that is to say vertically into the housing, to expose a cavity can be accomplished as described above.

The identification part may expediently have in the front part, seen in the opening direction, a flattening with the same angle as the associated stay.

This optimizes the relative arrangement of the identification part and the web.

In the embodiment with the web essentially parallel to the rear wall, the identification part is provided in the front part, seen in the opening direction of displacement, with a beveling of likewise at least about 5°, in particular of about 10°.

In a further practical embodiment, the hook part may be arranged essentially at one end, in particular at the rear end in the opening direction, of the identification part. The arrangement of an engaging groove or an engaging tongue, on the side of the identification part opposite the hook part, is also expedient. If the hook part is provided at the rear end of the identification part, seen in the opening direction of displacement, this provides good accessibility of the actuation parts, of the groove or the tongue, in every position of the identification part. In order to define the closed and open positions of the identification part, it is advantageous to provide catch devices for the opening and closed position between identification part and stay, in particular only on the web.

In order to prevent the identification part tilting or dropping out, it is advantageous to make the height of the identification part at least partly greater than the inside height of the half rear wall of the housing.

In a first embodiment, the hook part may have a vertically arranged continuation for support on the upper part of the cassette. If appropriate, a holding-down means for the identification part may also be additionally provided here. It is, however, better in a second embodiment if the identification part is made to correspond in height approximately to the inside height of the rear wall of the housing, since then there is no need for otherwise necessary holding-down means.

As far as the arrangement of the stay is concerned, a connection to a usually provided cylinder sleeve for a fastening screw is expedient, in particular for a longitudinally displaceable identification part. However, it may also be advantageous for the web to be connected to an inside wall usually provided in the housing, in particular for vertically displaceable identification parts.

It is, furthermore, advantageous if the identification part consists of a polyacetal material or a fluorocarbon material, in particular on account of their low abrasion properties and good sliding properties. The identification part may therefore expediently consist of polyoxymethylene (POM) or polytetrafluoroethylene (PTFE). The identification part may also generally consist of an abrasion-resistant plastic material with a proportion of pigment, in order in particular to make it possible in the production of the cassette for the identification parts to be produced, made ready, fitted and checked well.

Figure 2:
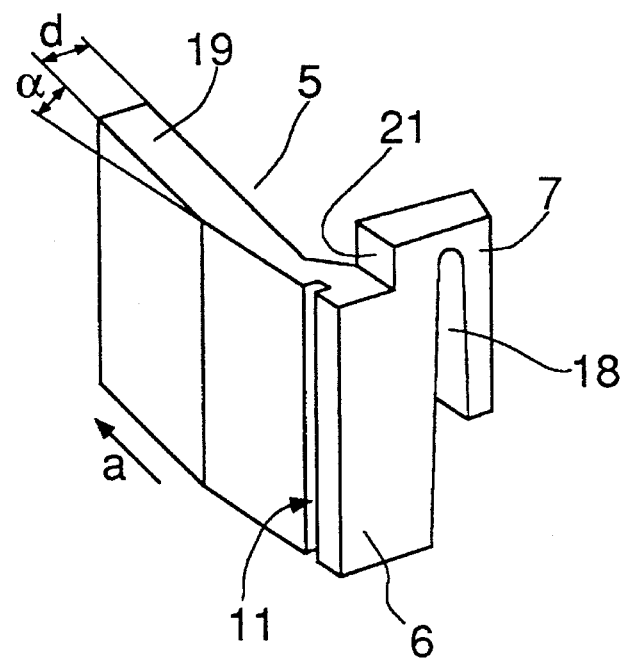
Figure 3:
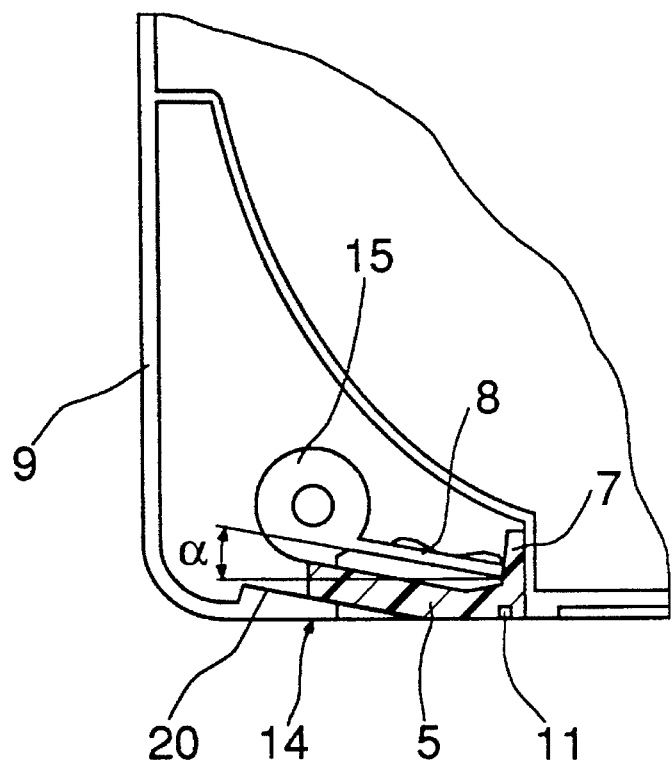
Figure 4:
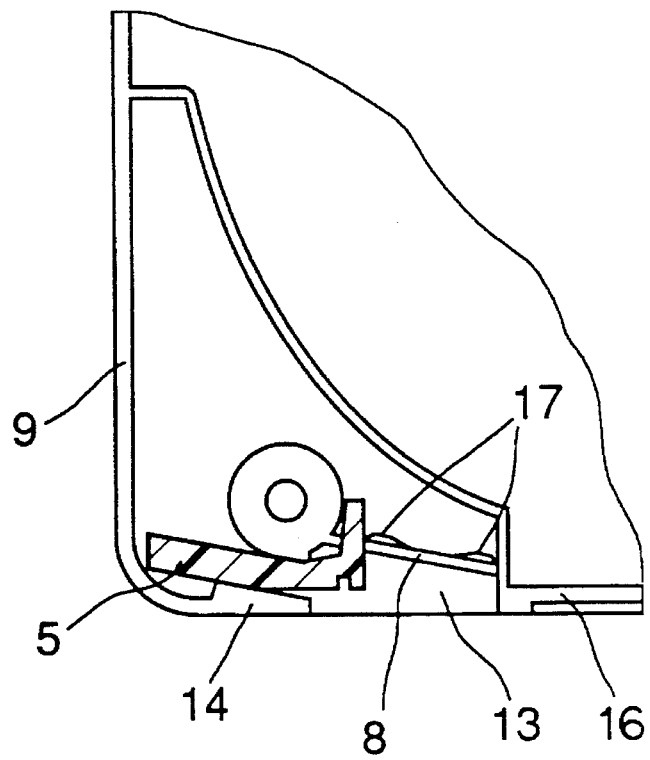
Figure 5:
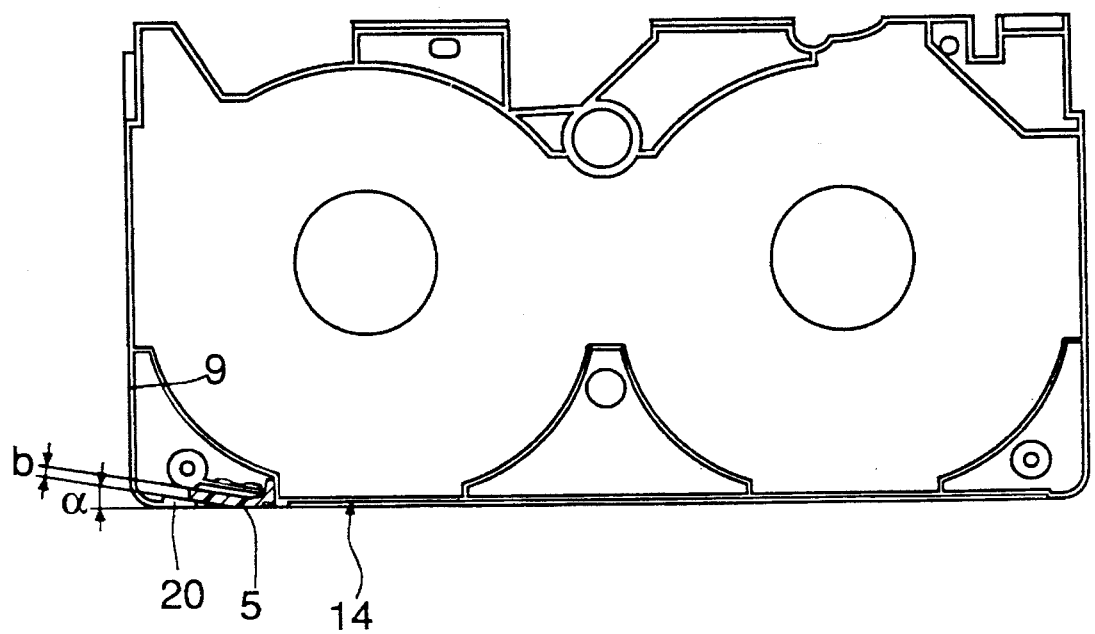
Figure 6:
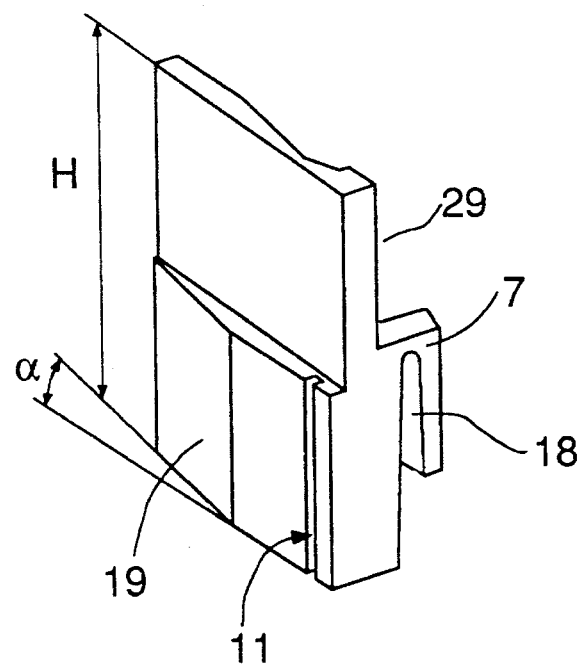
Figure 7:
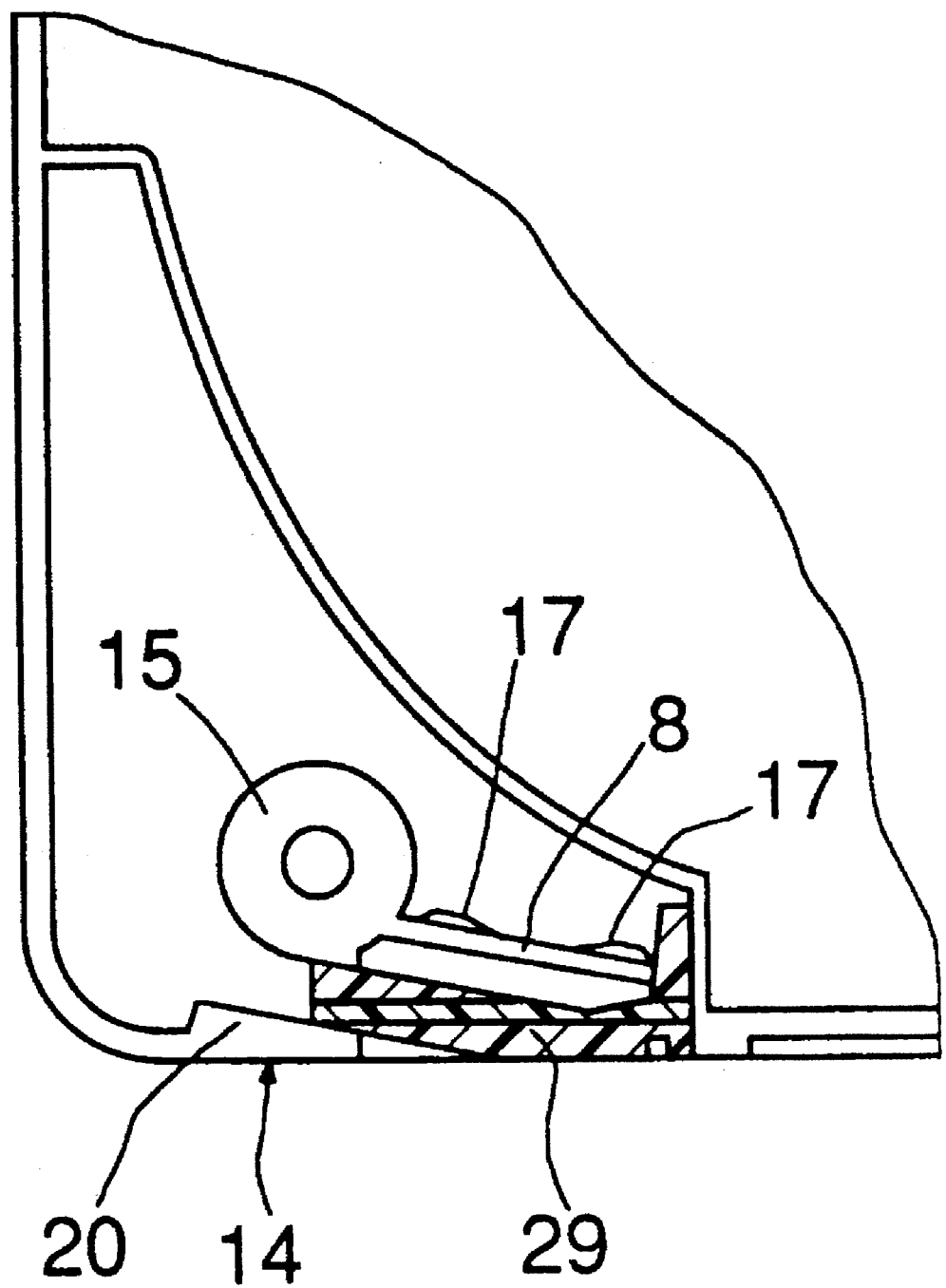
Figure 8:
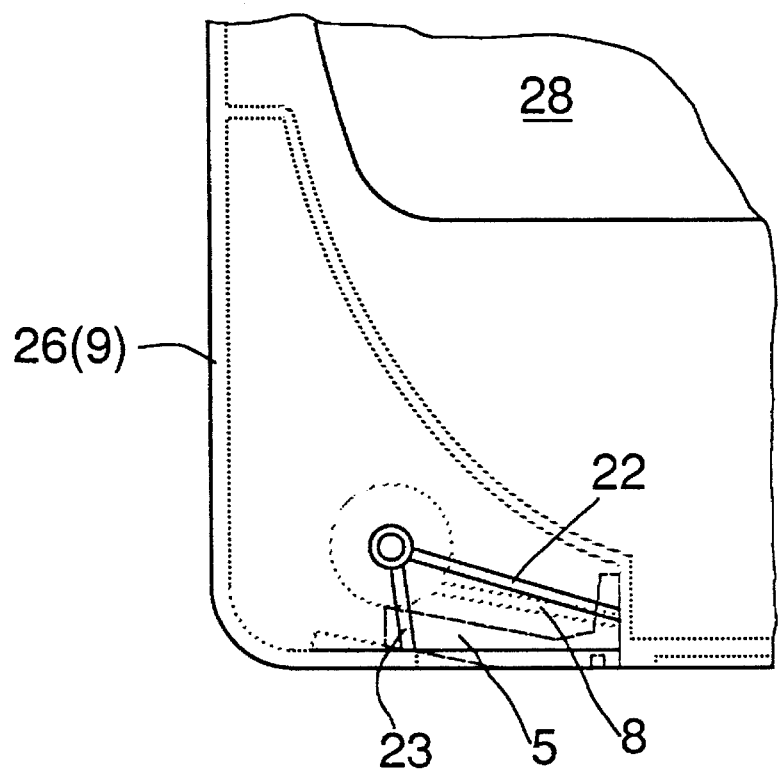
Figure 9:
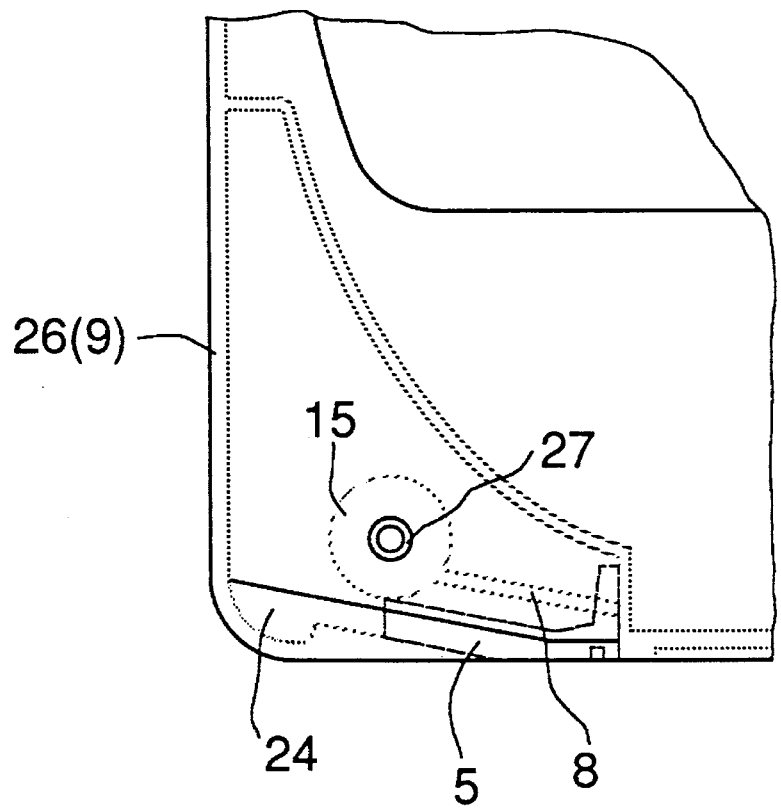
Figure 10:
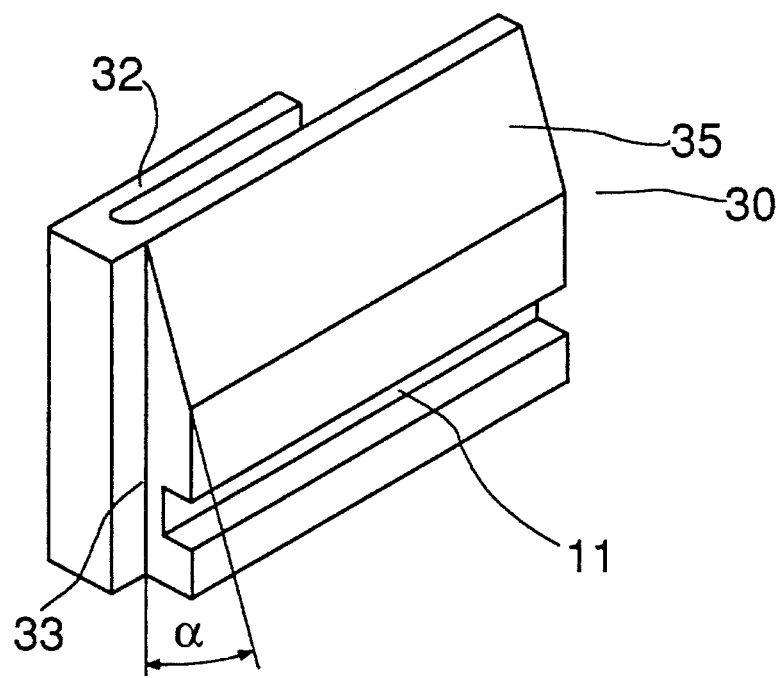
Figure 11:
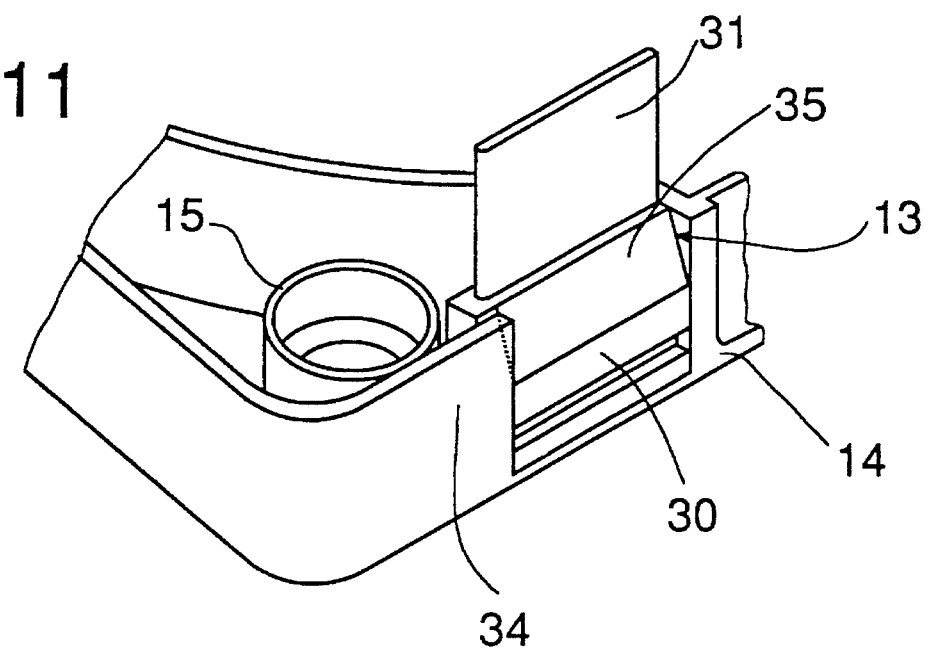

Illustrative embodiments of the invention are described below and represented in the drawing, in which:

FIG. 1 shows a perspective corner part of a cassette bottom part according to the invention, FIG. 2 shows a perspective identification part for use in a cassette according to FIG. 1, FIG. 3 shows a diagrammatic plan view of the corner part of the cassette bottom part according to FIG. 1 with an identification part according to FIG. 2 in the closed position, FIG. 4 shows the plan view from FIG. 3 with the identification part in the open position, FIG. 5 shows a reduced-scale, diagrammatic plan view of a complete cassette bottom part with the identification part in the closed position, FIG. 6 shows a version of an identification part of FIG. 2, FIG. 7 shows the identification part of FIG. 6 in the closed position in a diagrammatic plan view corresponding to FIG. 3, FIG. 8 shows a cutout of a ready-assembled cassette housing with holding-down ribs shown diagrammatically in the cassette upper part, FIG. 9 shows the cutout according to FIG. 8 with a rear wall thickening as holding-down means in the cassette upper part, FIG. 10 shows a further version of an identification part for vertical displacement, and FIG. 11 shows a perspective corner part of a cassette bottom part according to FIG. 1 with a web and the identification part according to FIG. 10 for vertical displacement.

FIG. 2 shows an identification part, slide 5, which can be hung by means of a hook part 7, provided at the rear end 6, on an inner wall as a web 8 of the bottom part 9 of the housing of a video cassette 10 and can be displaced in the opening direction (arrow a). An engaging groove 11, which can also be replaced by a tongue, serves for actuation of the identification part.

The term identification part as used with respect to this invention is to be understood as meaning any erase and write inhibiting means and symbols and markings on cassettes which are physically provided and can be sensed and evaluated by suitable equipment.

As the diagrammatic functional representations of FIGS. 3 and 4 reveal, the slide 5 serves by displacement in the plane of the bottom wall 12 of the cassette 10 for opening, see FIG. 4 for open position, and closing, see FIG. 3 for closed position, of the opening 13 or the cavity (FIG. 4) in the rear wall 14 of the cassette 10.

FIG. 5 shows a complete bottom part of the cassette 10, revealing that the corner part represented, for example in FIGS. 1, 3 and 4, is the left-hand rear corner of the bottom part 9. The following are further special features of the cassette 10 in FIGS. 1 to 5.

The web 8 is arranged between the cylindrical liner 15 for a fastening screw (not shown) and an inside wall 16 of the bottom part 9, said wall in this case running approximately perpendicularly with respect to the rear wall 14, this arrangement achieving a very stable design. The web 8 is provided on the rear with catch ribs 17, which interact with the flexible hook part 7, to be more precise with the hook gap 18 in the two catch positions, the open position (FIG. 4) and the closed position (FIG. 3).

The web 8 is arranged at an angle $\alpha$ of about 10° with respect to the rear wall 14 or with respect to the longitudinal axis (not shown) of the latter; the angle $\alpha$ may, however, be at least 5° and should in practice lie in the range of $\alpha$ being about 10° to $\alpha$ being about 20°.

As can be seen well in FIGS. 3 and 4, the thickness d of the front part 19 of the slide 5 is adapted to the width b of the distance between cylinder sleeve 15 and rear wall section 20 in such a way that the slide 5 on its displacement path into the open position and into the closed position, and in these two positions, is always guided itself at two points.

Of course, it is also possible to choose the arrangement and length of the hook part 32 of the slide 30, for example as shown in FIGS. 10 and 11, in such a way that a stable guidance on the displacement path and in the positions of rest is achieved even without any special guidance of the front part of the slide 30.

Rear wall section 20 and front part 19 of the slide 5 may, as shown, be expediently flattened off in a wedge-shaped manner, for instance with the angle $\alpha$ of the web 8. It is also possible, however, to design only one of the two surfaces as wedge-shaped or to make the corresponding edges rounded-off.

The vertical extension 21 of the hook part 7 serves the purpose of captivating the slide by guidance in the upper part of the cassette 10 and preventing tilting. The height of the front part 19 of the slide 5 corresponds approximately to half the inner height h of the overall inner height 2h of the rear wall 14.

In order to stabilize the position of the slide 5 still further, it is also possible, as FIGS. 8 and 9 show, to provide holding-down means, additional stays 22 and 23 in FIG. 8 or a thickening 2 of the rear wall 24 of the upper part 26 in FIG. 9, which are arranged above the slide 5 and prevent it from undesirable vertical movement. In FIGS. 8 and 9, the lines of the upper part 26 of the cassette 10 are shown solid and the lines of the bottom part 9 are shown broken. 27 denotes the counterpart of the cylinder liner 15. 28 is a part of the window in the upper part 26.

As an alternative to the described holding-down means of FIGS. 8 and 9, FIG. 6 shows a design of a slide 29 of a height H which is greater than half the inside height h and may essentially correspond to the entire inside height 2h of the rear wall 14. This achieves better tilting stability, better guidance and good sliding movement of the slide 29 without complicated modifications to the upper part 26. The design of the slide 29, hook part 7 and groove 11 is otherwise unchanged from that of slide 5. On the front part 19, however, there can be seen a beveling at the angle $\alpha$, which basically enables the slide 29 to move into the housing of the cassette 10 even without an angled position of the web 8, that is to say with an essentially parallel position with respect to the rear wall 14. FIG. 7, however, shows the slide 29 again in connection with the web 8 positioned obliquely at the angle α, corresponding to FIGS. 1 and 3 to 5.

FIGS. 10 and 11 show a slide 30 in connection with a web 31 which extends higher than the inside height h of the half rear wall 14 and in this case is formed on the inside wall 16 and not on the cylinder liner 15. Thus, a cylinder liner 15 need not be provided, which is also the case of course in cassette housings which are riveted or welded and not screwed. The sleeve 15 is also omitted if a screwed joint is not provided at this point.

The slide 30 is provided with a hook part 32, which extends over the full height and is attached in a position turned through 90° in comparison with the hook part 7, in order to make it possible to grip around the in this case vertical web 31 and to achieve guidance over the vertical displacement path by the greater length of the hook part 32 in comparison with hook part 7. A guiding angled edge 33 further improves this guiding effect by support on the end of the rear wall section 24. The web 31 is in this case perpendicular and not inclined at an angle to the upright rear wall 14, as is the web 8 with respect to the longitudinal axis of the rear wall 14.

Therefore, the slide 30 is given a beveling 35 at an angle α of at least 5°, in practice of from about 10° to about 20°, in order that the slide 30 can be pushed along the vertical displacement path past the lower edge (not shown) of the rear wall half, into the upper part 26 of the cassette 10.

It is also possible, however, to design the web 31 as inclined rearwards (into the plane of the drawing) at the angle α described above of at least 5°, in practice of from about 10° to about 20°. In the latter case also, depending on how the edge of the rear wall 14 of the upper part 26 is designed, the front part of the slide 30 can likewise be designed with a wedge-shaped flattening, as in the case of the front part 19 in FIG. 2.

A polyacetal or a fluorocarbon may be expediently used as material for the slide 5, 29 or 30, for example polyoxymethylene or polytetrafluoroethylene, on account of their low abrasion properties and good sliding properties. However, it is also possible to use abrasion-resistent plastic. All suitable plastics may also contain pigments.

A cassette with a recording medium, in particular a magnetic recording medium, is designed with a displaceable identification part which can be pushed into the cassette housing. For this purpose, a web is provided behind a cassette opening in a cassette wall, which web runs at an angle with respect to said cassette wall. It is also possible to provide a web which is approximately parallel to the cassette wall, and the identification part, designed as a slide, is provided with a front beveling, in the opening sliding direction, in order to push the slide partially past the edge of the cassette wall located in the opening direction.

The cassette can be used for recording/reproducing signals of any type, and any functions of the associated cassette apparatus can be controlled indirectly by the positionally displaceable identification part.

The slide mechanisms described have been used in practice and tested as erase-inhibiting elements in video cassettes and have also performed extremely well in extended time tests.

We claim:

1. In a magnetic tape cassette comprising a housing with top, bottom, front, rear and side walls, wherein at least one of said front, rear or side walls has at least one opening therein, which opening, when uncovered, provides a cavity in the housing such that when the opening is uncovered, recording and/or erasure is inhibited, and when said opening is covered recording and/or erasure is uninhibited;

the improvement wherein the housing is provided with an inner wall section, which inner wall section forms an angle to the wall having the opening;

and wherein a displaceable identification part for covering and uncovering said opening is provided within the housing, said identification part having a length and height sufficient to cover said opening when in the covering position, said identification part comprising a hook part and a front part, said front part is beveled in the direction for displacement of the identification part adapted to uncovering the opening, wherein said hook part has a hook gap which hooks over the back of said inner wall section for the identification part to slide along said inner wall section as it is displaced, said front part providing for guidance of the identification part on the inner surface of the portion of the wall having the opening;

whereby the identification part is displaceable into the housing, sliding along the inner wall section on a path oblique to the wall in which the thereby-uncovered opening is located.

2. A cassette as claimed in claim 1, wherein the wall is a web on the bottom wall or top wall of the housing.

3. A cassette as claimed in claim 2, wherein the web on which the hook part is displaceable is arranged at an angle of at least about 5° with respect to the longitudinal axis of the wall with the opening therein.

4. A cassette as claimed in claim 1, wherein the said front part is beveled at essentially the same angle at which the inner wall is arranged.

5. A cassette as claimed in claim 1, wherein the hook part is arranged essentially at one end of the identification part.

6. A cassette as claimed in claim 1, wherein an engaging means is provided on the side of the identification part opposite the hook part.

7. A cassette as claimed in claim 1, wherein catch devices for the open and closed position are provided between the identification part and said inner wall.

8. A cassette as claimed in claim 1, wherein the height of the identification part is at least partly greater than the inside height of the half rear wall of the housing.

9. A cassette as claimed in claim 1 wherein the inner wall is a web connected to a cylinder sleeve for a fastening screw of the cassette housing.

10. A cassette as claimed in claim 1, wherein the inner wall is a web which is connected to another inside wall of the housing.

11. A cassette as claimed in claim 1, wherein at least one holding-down means for the identification part is provided in the cassette housing above the displacement path.

12. A cassette as claimed in claim 1, wherein the identification part corresponds in height approximately to the inside height of the rear wall of the housing.

13. A cassette as claimed in claim 1, wherein the identification part consists of a polyacetal material material.

14. A cassette as claimed in claim 1, wherein the identification part consists of an abrasion-resistant plastic with a proportion of pigment.

15. A cassette as claimed in claim 1 wherein a cylinder sleeve for fastening of the cassette housing is provided within the housing in the vicinity of said opening, wherein the front part of the identification part is guided between the inner surface of the wall section in the opening direction and the peripheral surface of the said sleeve.

16. A cassette as in claim 1 wherein the wall containing the at least one opening is the rear wall.

17. A cassette as in claim 3 wherein said angle is between 10° to about 20°.

* * * * *